United States Patent [19]

Hiramatsu

[11] Patent Number: 4,534,244
[45] Date of Patent: Aug. 13, 1985

[54] AUTOMATIC TRANSMISSION GEAR SYSTEM FOR VEHICLES

[75] Inventor: Takeo Hiramatsu, Kyoto, Japan

[73] Assignee: Mitsubishi Jidosha Kogyo Kabushiki Kaisha, Tokyo, Japan

[21] Appl. No.: 421,319

[22] Filed: Sep. 22, 1982

[30] Foreign Application Priority Data

Oct. 30, 1981 [JP] Japan .................. 56-174080

[51] Int. Cl.³ .............................. B60K 41/06
[52] U.S. Cl. ...................... 74/869; 74/843; 74/867
[58] Field of Search .............. 74/843, 862, 861, 863, 74/866, 867, 868, 869; 192/3.31; 364/424.1

[56] References Cited

U.S. PATENT DOCUMENTS

| | | | |
|---|---|---|---|
| 3,078,736 | 2/1963 | Meads et al. | 74/868 |
| 3,309,939 | 3/1967 | Pierce, Jr. | 74/869 X |
| 3,546,974 | 12/1970 | Fox et al. | 74/869 |
| 3,783,713 | 1/1974 | Will | 74/867 X |
| 3,785,224 | 1/1974 | Will | 74/867 X |
| 3,813,964 | 6/1974 | Ichimura et al. | 74/866 |
| 3,890,856 | 6/1975 | Miyauchi et al. | 74/869 |
| 3,908,485 | 9/1975 | Miyauchi et al. | 74/867 |
| 3,908,486 | 9/1975 | Mitamura et al. | 74/869 |
| 4,034,628 | 7/1977 | Sakai et al. | 74/869 |
| 4,056,991 | 11/1977 | Sakai et al. | 74/863 |
| 4,155,277 | 5/1979 | Minami et al. | 74/866 |
| 4,252,148 | 2/1981 | Fochtman et al. | 74/868 X |
| 4,259,882 | 4/1981 | Miller | 74/862 |
| 4,262,335 | 4/1981 | Ahlen et al. | 74/866 X |
| 4,274,308 | 6/1981 | Iwanaga et al. | 74/869 |
| 4,367,812 | 1/1983 | Kobayashi et al. | 74/867 X |
| 4,418,587 | 12/1983 | Kauffman | 74/867 |
| 4,425,620 | 1/1984 | Batcheller et al. | 74/866 X |
| 4,428,467 | 1/1984 | Hiramatsu | 192/3.31 |

FOREIGN PATENT DOCUMENTS

| | | | |
|---|---|---|---|
| 2026631 | 2/1980 | United Kingdom | 74/868 |
| 2033033 | 5/1980 | United Kingdom | 74/868 |

Primary Examiner—Lawrence J. Staab
Assistant Examiner—Dwight G. Diehl

[57] ABSTRACT

An automatic transmission gear system for vehicles comprising a plurality of advance gears, a oneway clutch for achieving a gear shift at a lower speed and friction engagement devices provided in parallel with said oneway clutch is further provided with detecting means to detect at least one parameter indicating the operating or driving conditions of the vehicle and an oil pressure control device which supplies said friction engagement devices with a high pressure oil in accordance with the signals from said detecting means when the engine brake is necessary and with a low pressure oil when the engine brake is not necessary, thereby reducing the shocks due to gear shifting and economizing fuel consumption.

3 Claims, 5 Drawing Figures

| select lever & auxiliary switch | | P | R | N | D4 | | | | D3 | | | 2 | | L | |
|---|---|---|---|---|---|---|---|---|---|---|---|---|---|---|---|
| shifting gear | | — | R | — | 1st | 2nd | 3rd | 4th | 1st | 2nd | 3rd | 1st | 2nd | 1st | 2nd |
| friction engagement devices | front clutch 11 | | ○ | | | | ○ | | | | ○ | | | | |
| | rear clutch 12 | | | | ○ | ○ | ○ | | ○ | ○ | ○ | ○ | ○ | ○ | ○ |
| | kick down brake 14 | | | | | ○ | | ○ | | ○ | | | ○ | | ○ |
| | low reverse brake 15 | ○ | ○ | | | | | | | | | | | ○ | |
| | one way clutch 16 | | | | ● | | | | ● | | | ● | | | |
| | 4th speed clutch 13 | | | | | | | ○ | | | ○ | | | | |
| | transmission ratio | — | 2.176 | — | 2.846 | 1.581 | 1.000 | 0.685 | 2.846 | 1.581 | 1.000 | 2.846 | 1.581 | 2.846 | 1.581 |

AUTOMATIC TRANSMISSION GEAR SYSTEM FOR VEHICLES

BACKGROUND OF THE INVENTION

The present invention relates to an improvement in an automatic transmission gear system for vehicles, and more particularly, it aims to reduce the shocks due to gear shifting and to economize fuel consumption.

Conventionally, an automatic transmission system employed in an automobile and the like operates by means of an oil pressure control device which controls a plurality of advance gears. In order to achieve automatic transmission, plural engagement devices of mechanical type such as a oneway clutch and of the type operated by oil pressure such as brakes and clutches are provided and are suitably selected and engaged.

For example, a oneway clutch is commonly used to alleviate the shocks caused when shifting a low speed gear, normally the first gear, to the second or vice versa. Although such oneway clutch is capable of transmitting the driving force of the engine to the wheels, it races and fails to function when it is necessary to apply engine brake. Another friction engagement device operated by oil pressure such as a brake is, therefore, provided in parallel with the oneway clutch so that as the brake is engaged by the supply of high pressure oil, the engine brake can function.

However, the engine brake at the 1st speed is necessary only when the manual gear selection is at the L-range, and for the 2nd speed driving, engine brake at 2nd gear achieves the effect. In the D-range driving, the 1st speed gear is necessary only at the time of starting the vehicle.

It would therefore increase loss in the operation of the oil pump which supplies the brake with high pressure oil to engage the same for applying the engine brake at the 1st speed during driving in the ranges other than the L-range. Moreover, it is difficult to timely engage the friction engagement devices and release the brake for shifting the 1st gear to the second, and the difficulty often causes undesirable shocks in gear shifting. On the other hand, if the system is so constructed as to supply high pressure oil to the brake only during the L-range driving, this would then bring about such disadvantages as that the control circuit for the oil pressure becomes extremely complicated.

OUTLINE OF THE INVENTION

The present invention aims to provide an automatic transmission gear system for vehicles capable of reducing the shocks at the time of gear shifting and economizing fuel consumption. In order to achieve the object, the automatic transmission gear system according to the present invention comprises plural speed gears in advance, a oneway clutch for achieving a gear shift at a lower speed and a friction engagement device provided in parallel with said clutch and operated by oil pressure and is further provided with means to detect at least one parameter indicating the operating or driving conditions of a vehicle and an oil pressure control device which supplies said friction engagement device with high pressure oil in response to the signal from said detecting means when it is necessary to apply engine brake at said lower speed and with low pressure oil when engine brake is not necessary.

DETAILED DESCRIPTION OF THE INVENTION

One embodiment according to the present invention will now be described in detail with reference to the accompanying drawings.

Figures 1, 2:
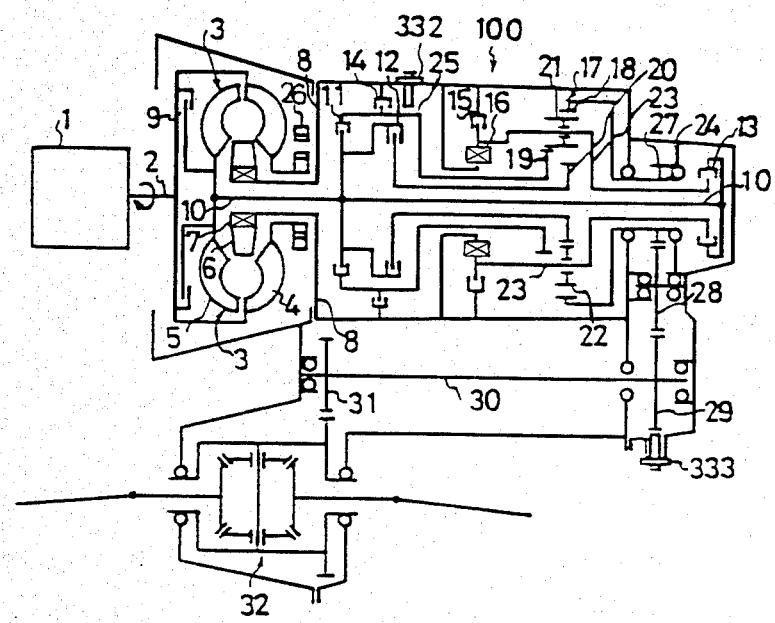
FIG. 1 shows the power train of an automatic transmission gear system for vehicles.
FIG. 2 shows the state of each friction engagement device in relation to the position of the select lever.

First, the structure of the automatic transmission gear system for vehicles according to the present invention will be outlined with reference to the power train shown in FIG. 1.

A crank shaft 2 of an engine 1 which is the power source of a vehicle is directly coupled to a pump 4 of a torque converter 3. The torque converter 3 has the pump 4, a turbine 5, a stator 6 and a oneway clutch 7. The stator 6 engages with a case 8 by means of the oneway clutch 7. The stator 6 is so constructed as to rotate in the same direction as the crank shaft 2 by means of the clutch 7 but not to be permitted to rotate in the opposite direction. A direct coupling clutch 9 is provided between the crank shaft 2 and the turbine 5 and directly coupled with a given slip factor.

The output of the engine 1 is thus transmitted to the turbine 5 by way of either the directly coupling clutch 9 or the torque converter 3.

The torque transmitted to the turbine 5 is further transmitted to a row of speed shifting gears 100 which is provided behind of an input shaft 10 for achieving four variable speeds in advance and 1 speed in reverse.

The row of speed shifting gears 100 comprises three units of clutches 11, 12 and 13, two sets of brakes 14 and 15, a oneway clutch 16 and a planet gear unit 17 of Ravignaeux type, the brake 15 and the oneway clutch 16 being positioned in parallel with each other.

The planet gear unit 17 comprises an annulus gear 18, a reverse sun gear 19, a forward sun gear 20, a long pinion 21, a short pinion 22 and a carrier 23.

The annulus gear 18 is fixed to an output shaft 24, the reverse sun gear 19 is fixed to a kick-down drum 25, which is fixed to the case 8 by means of a kick-down brake 14 and integrally connected with the input shaft 10 by means of the front clutch 11. The forward sun gear 20 is integrally connected with the input shaft 10 by means of the rear clutch 12. The carrier 23 which holds the long pinion 21 and the short pinion 22 is fixed to the case 8 by means of the oneway clutch 16 and at the same time, is integrally connected with the input shaft 10 by means of the 4-speed clutch 13 provided at the far end of the row of speed shifting gears 100. The carrier is further fixed to the case 8 by means of the low reverse brake 15. The oneway clutch 16 is provided in order to prevent the carrier 23 from rotating in reverse direction.

Said three sets of clutches 11, 12 and 13 and the two sets of brakes 14 and 15 are the friction engagement devices which operate by oil pressure. The oil pressure to be supplied to each hydraulic piston for activating each friction engagement device is provided in an oil pump 26.

The output which has passed the row of speed shifting gears 100 is transmitted to a transfer-driven gear 29 via a transfer drive gear 27 fixed on the output shaft 24 and a transfer idle gear 28. It is then transmitted to a differential gear 32 by means of a transfer shaft 30 and a helical gear 31 integrated with said transfer driven gear 29.

Speed shifting can be obtained by selectively operating said different friction engagement devices in accordance with the driving state of a vehicle detected by various detecting means to be described below. This can be done by manipulating a select lever at the driver's seat (not shown) and an auxiliary switch for selecting different modes of driving of $D_4$, $D_3$, 2 and L to be described below.

Selection can be made from select patterns of P (parking), R (reverse), N (neutral), $D_4$ (automatic change at 4th advance speed), $D_3$ (automatic change at 3rd advance speed), 2 (automatic change at 2nd advance speed) and L (fixed 1st speed). The select lever has four positions for P, R, N and D. The auxiliary switch comprising an inhibitor switch and a shifting switch selects a mode of driving from L, 2, $D_3$ and $D_4$ when the select lever is positioned at D.

FIG. 2 shows which friction engagement devices operate in what way when the select lever and the auxiliary switch are positioned at said different select patterns. By selectively operating the friction engagement devices in different combination as shown in FIG. 2, it is possible to obtain variable speeds, i.e. 4 speeds in advance and 1 speed in reverse.

In the table, the mark denotes that a friction engagement device is in engagement by the action of oil pressure while the mark denotes that the carrier 23 is suspended by the action of the oneway clutch 16. The abbreviations 1st, 2nd, 3rd and 4th in the column indicating the position of the select lever and the auxiliary switch denote the first, second, third and fourth speed respectively. The mark shows that a friction engagement device is in engagement because of oil pressure supplied by the structure of the oil pressure control means for selectively activating different friction engagement devices but that said engagement is only to such an extent that it would cause slip if the vehicle is to be driven only by the low reverse brake 15 because the oil pressure is low.

Figure 3:
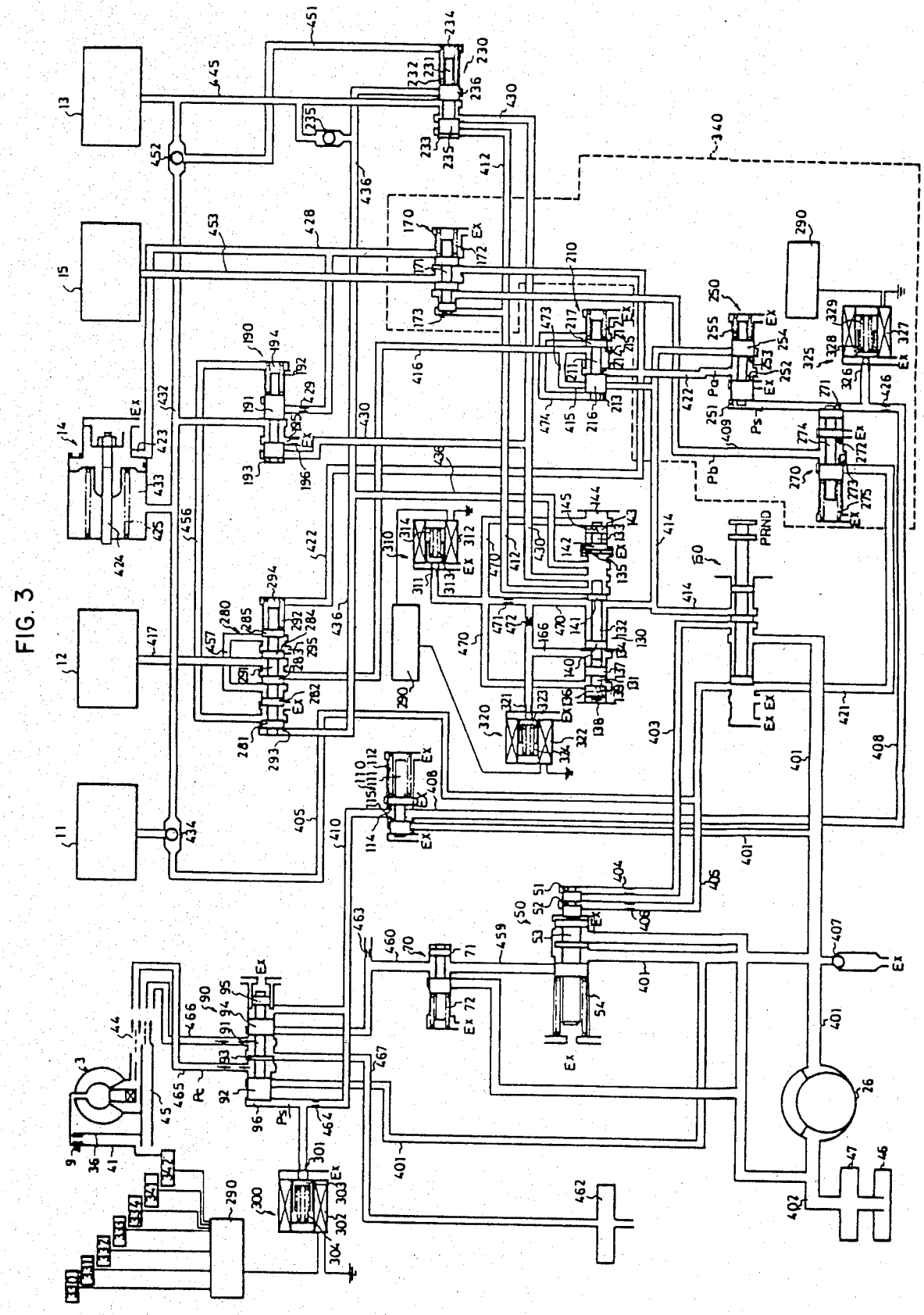
FIG. 3 is a chart showing the main oil pressure control system according to one embodiment of the present automatic transmission gear system.

Referring now to FIG. 3, the oil pressure control device of the automatic transmission gear (oil pressure control device for low reverse brake) will be described along with the main pressure control device which controls said friction engagement devices of said automatic transmission gear.

The main oil pressure control device controls the oil pressure at which oil passing from an oil sump 46 to be discharged at the oil pump 26 via an oil filter 47 and an oil pass 402 is supplied to each oil pressure chamber. The oil is supplied to activate each piston for the torque converter 3, the direct coupling clutch 9, the front clutch 11, rear clutch 12, the kick-down brake 14, the low reverse brake 15 and the 4th speed clutch 13. The control is made in accordance with the driving state of the vehicle. The device mainly comprises a pressure adjusting valve 50, a torque converter control valve 70, a direct coupling clutch control valve 90, a pressure reducing valve 110, a shift control valve 130, a manual valve 150, a 1st-2nd speed shift valve 170, a 2nd-3rd and 4th-3rd speed shift valve 190, an N-D control valve 210, a 4th speed clutch control valve 230, an oil pressure control valve 250 at the time of shifting, an N-R control valve 270, a rear clutch control valve 280, and four solenoid valves 300, 310, 320 and 325. Among these valves, the 1st-2nd speed shift valve 170, the oil pressure control valve 250, the N-R control valve 270 and the solenoid valve 325 constitute an oil pressure control device 340 for the low reverse brake 15 encircled by the broken line in FIG. 3. Elements are connected by oil passes.

The solenoid valves 300, 310, 320 and 325 are identical in structure and are of the type which closes when the electricity is cut off for controlling the opening and closing of orifices 301, 311, 321 and 326 with electric signals from the electronic control device 290. They include solenoids 302, 312, 322 and 327, valves 303, 313, 323 and 328 for opening and closing orifices 301, 311, 321 and 326 provided in respective solenoids and springs 304, 314, 324 and 329 for energizing said valves in the closing direction.

The electronic control device 290 controls activation and suspension of the solenoid valves 300 and 325 wherein a means for detecting the start of shifting gears and the like are contained to detect the driving state of the vehicle for the duty control. It also controls amplitude of the single pulse current of several to several tens of Hz, for example 50 Hz, which is supplied to the solenoid valves, whereby the opening of the valves is timed to control the oil pressure. At the same time, it also controls opening and closing of the solenoid valves 310 and 320 for ON-OFF control. A means 330 which detects the negative pressure at the intake manifold or the degree of opening of the throttle valve (not shown) of the engine 1 for detecting the driving state of the vehicle, a means 331 for detecting the number of rotations of the engine 1, a means 332 for detecting the number of rotations of the kick-down drum 25 shown in FIG. 1, a means 333 for detecting the number of rotations of the transfer driven gear 29 provided to detect the number of rotations of the output shaft 24 and a means 334 for measuring the temperature of the lubricant oil are main elements in the input of the valves 310, 320. It further comprises a means 341 to detect the position of the select lever, a means 342 to detect the position of the auxiliary switch and the like.

The oil pumped out from the oil pump 26 passes through the oil pass 401 to be guided to the pressure adjusting valve 50, the manual valve 150, the direct coupling clutch control valve 90 and the pressure reducing valve 110.

The pressure controlling valve 50 comprises a spool 53 having surfaces 51 and 52 to receive the pressure and a spring 54. When the manual lever 150 is set at N or D by the select lever, the oil pressure in the oil pass 401 is transmitted through said manual valve 150 and acts on the surface 51 via the oil pass 403 and an orifice 404. As a result, the oil pressure in the oil pass 401 is controlled to a constant pressure of 6 kg/cm$^2$ (this pressure is referred to as the line pressure hereinafter). On the other hand, when the manual valve 150 is set at the position R, the oil pressure of the oil pass 401 acts on the surface 52 by passing through said manual valve 150, an oil pass 405 and an orifice 406, whereby adjusting the oil pressure in the oil pass 401 at 14.6 kg/cm$^2$. Note here that a release valve 407 provided in the oil pass 401 is an escape valve for releasing the high pressure oil discharged from the oil pump 26.

The oil introduced to the reducing valve 110 via the oil pass 401 is adjusted to 2.4 kg/cm² by said valve and further guided to oil passes 408 and 410.

The reducing valve 110 has a spool 111 and a spring 112, and it controls the pressure by the balance between the oil pressure determined by the difference in area of surfaces 114 and 115 which are formed opposing the spool 111 and the spring force of the spring 112.

The pressure controlled oil to be introduced to the oil pass 408 supplies constant pressure to the oil pressure control device 340 which controls the low reverse brake 15. It reaches the control side of the oil pressure control valve 250, the control side of the N-R control valve 270 and the orifice 326 of the solenoid valve 325 via an orifice 426. By the action of the solenoid valve 325 which is controlled by the electronic control device 290, the oil pressure passing downstream of the orifice 426 in the oil pass 408 is varied to produce an output pressure in oil passes 422 or 409 in correspondence with the condition during the first speed driving other than at the time of shifting the gear or the first speed driving in the L-range.

Various valves constituting the oil pressure control device 340 for controlling the low reverse brake 15 will now be described.

The valve 170 for shifting between the 1st speed and the 2nd speed comprises a spool 171 and a spring 172. The difference between the line pressure acting on a pressure receiving surface 173 at the left of the spool 171 and the spring force of the spring 172 enables selective switching of the position of the spool 171 between the left end in FIG. 3 and the right end (not shown).

The oil pressure control valve 250 comprises a spool 254 having pressure receiving surfaces 251, 252 and 253 and a spring 255. The oil pressure at the oil pass 422 is adjusted to a predetermined value by the balance of the oil pressure acting on the surface 251 and the force combined by the oil pressure caused by the difference in area between the surfaces 252 and 253 with the spring force of the spring 255.

The N-R control valve 270 comprises a spool 274 having pressure receiving surfaces 271, 272 and 273 and a spring 275. The oil pressure in an oil pass 409 is adjusted to a predetermined value by the balance of the oil pressure acting on the surface 271 and the force combined by the oil pressure caused by the difference in area between the surfaces 252 and 253 with the spring force of the spring 275.

The oil pressure control valve 250 and the N-R control valve 270 are so constructed that when either one of them is in controlling operation, the other is suspended, and each absorbs the control pressure pulse at the downstream of the orifice 426 of the oil pass 408 as an accumulator by the oil pressure from the surface 251 or 271 and by the spring action of 255 or 275. The output oil pressure guided to the oil pass 422 controls the rear clutch 12, the kick-down brake 14 and the low reverse brake 15 during the advance driving. On the other hand, the output oil pressure guided to the oil pass 409 controls the low reverse brake 15 during the reverse driving.

The solenoid valve 325 detects different driving conditions and the selected driving modes by means of the electronic control device 290 by the signals from various means for detecting the driving conditions such as 330 for engine load, 333 for number of engine rotation, 334 for oil temperature, etc. and the means for detecting various positions such as 341 for select lever, 342 for the auxiliary switch, etc. Depending on the detected state of the vehicle, the pulse amplitude is varied by the duty control at several to several tens of Hz, e.g. 50 Hz, to control the opening and closing time of the orifice 326. The oil pressure Ps which acts on the pressure receiving surface 251 of the oil pressure control valve 250 or the surface 271 of the N-R control valve 270 is controlled by the solenoid valve 325 between about 0.3 to 2.1 kg/cm² when the orifice 426 is set at 0.8$\phi$ and the orifice 326 at 1.4$\phi$.

Figure 4:
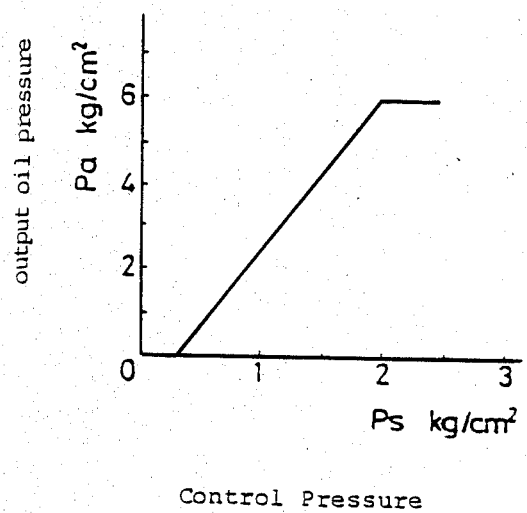
FIGS. 4 and 5 are graphs showing the fluctuation in the output pressure from the oil pressure control device of the automatic transmission system according to the present invention.
Figure 5:
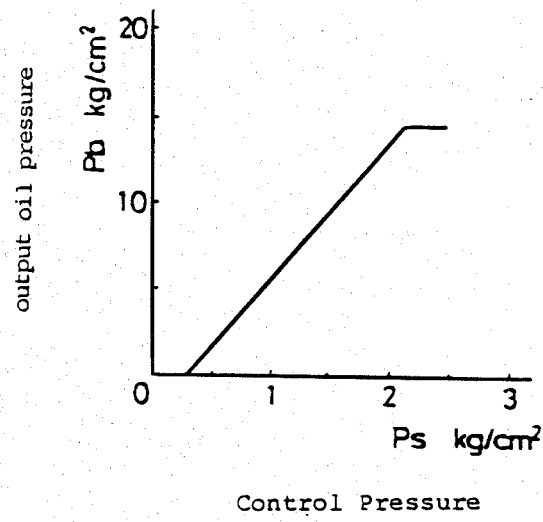

Thus at the oil pressure control valve 250, when the oil pressure at the line pressure of 6 kg/cm² supplied from the oil pass 414 is transmitted to the oil pass 422 as an output oil pressure Pa by the oil pressure Ps, it is adjusted between 0 to 6 kg/cm² as shown in FIG. 4 to reduce/increase the oil pressure to be supplied to the low reverse brake 15 via the 1st-2nd speed shifting valve 170. On the other hand, at the N-R control valve 270, when the oil pressure at the line pressure of 14.6 kg/cm² supplied from the oil pass 421 is transmitted to the oil pass 409 as an output oil pressure Pb, the pressure Pb is adjusted between 0–14.6 kg/cm² as shown in FIG. 5.

Besides said various detecting means 331, 333 and 334, the timing and the period of time for activating the solenoid valve 325 are also determined by a means for detecting start of gear shifting which is contained in the electronic control device 290 and a means for detecting the time of engagement comprising two, number of engine rotations detectors 332 and 333.

Various valves constituting the main oil pressure device will now be described.

The shift control valve 130 is controlled by a pair of ON-OFF controlled solenoid valves 310 and 320 by selectively opening and closing the same for 4th speed shifting in advance. The shift control valve 130 comprises a spool divided into three parts, i.e. spools 131, 132 and 133 and two stoppers 134 and 135. Two lands 136 and 137 are provided in the spool 131 as well as an oil hole 139 which connects an oil chamber 138 located outside the land 136 with the lands 136 and 137. The spool 132 is provided with two lands 140 and 141 having a different diameter each and a pressurizing portion at both ends in abutment with the spools 131 and 133. Still further, the spool 133 is provided with two lands 142 and 143 as well as an oil hole 145 which connects an oil chamber 144 located outside the land 143 with the lands 142 and 143. Interposed between the spools 131 and 132 is the stopper 134 formed with a hole to let the pressurizing portion at the end of the spool 131 penetrate therethrough to fix with the casing. The stopper 135 is interposed between the spools 132 and 133, and the pressurizing portion at the end of the spool 132 penetrates a through hole formed in the stopper to fix with the casing.

An oil pass 470 which constantly connects with the lands 140 and 141 of the spool 132 also connects with an oil pass 414 of the manual control valve 150. It further connects with the orifice 311 which opens and closes by means of the solenoid valve 310 via the orifice 471 as well as with the oil pressure chambers 138 and 144. Also, the oil pass 470 connects with the orifice 321 which opens and closes by means of the solenoid valve 320. At the same time, it connects the spools 131 and 132 when they are at the positions shown in FIG. 3. The spools 131, 132 and 133 are controlled by opening and closing of the solenoid valves 310 and 320 for 4 variable speed shifting. The relation between opening and closing of the solenoid valves 310, 320 with the consequent gear shift are shown in Table 1. In the table, the mark o denotes ON and x OFF.

TABLE 1

|  | Solenoid Valve 310 | Solenoid Valve 320 |
|---|---|---|
| 1st | o | o |
| 2nd | x | o |
| 3rd | x | x |
| 4th | o | x |

The shift valve 190 for shifting between 2nd-3rd and 4th-3rd has a spool 191 and a spring 192. At the left of the spool, an oil pressure chamber 193 to which the line pressure is introduced is located. At the right, an oil pressure chamber 194 is provided, and the position of each spool can be selectively switched between the left end shown in FIG. 3 and the right end (not shown).

The N-D control valve 210 comprises a spool 211 having two lands 216 and 217 having a different diameter each and a spring 212. The position of the spool 211 is selectively switched between the left end shown in FIG. 3 and the right end (not shown) in correspondence with the combined force of the spring 212 with the oil pressure acting on pressure receiving surfaces 213 and 214 on both sides of the land 216 and the surface 215 of the land 217 facing the land 216 with the spring 212.

The 4-speed clutch control valve 230 comprises a spool 231 having two lands 235 and 236 and a spring 232. At the left of the land 235 of the spool 231 is provided with an oil pressure chamber 233 and an oil pressure chamber 234 at the right of the land 236. The position of the spool 231 is selectively switched between the left end as shown in FIG. 3 and the right end (not shown).

The rear clutch control valve 280 comprises a spool 291 having five lands 281, 282, 283, 284 and 285 and a spring 292. The land 281 is made slightly larger than the land 285 in diameter. The position of the spool 291 is selectively switched between the left end as shown in FIG. 3 and the right end (not shown) by the balance of the forces between the spring 292 and the force caused by the oil pressure introduced in an oil pressure chamber 294 located outside (at the left in FIG. 3) and acting on the pressure receiving surface of the land 281, and the oil pressure introduced in the oil pressure chamber 294 located outside (at the right in FIG. 3) and acting on the pressure receiving surface of the land 285.

Control of gear shift by different combination of the friction engagement devices will be described in connection with the action of the oil pressure control device 340 for controlling the main oil pressure device and the lower reverse brake.

As the manual valve 150 is switched from N as shown in FIG. 3 to D, the line pressure adjusted at 6 kg/cm² is introduced from the oil pass 401 to the oil pass 414. The line pressure in the oil pass 414 is then guided to the oil pressure chamber of the rear clutch 12 via the oil pressure control valve 250, oil pass 422, N-D control valve 210, oil pass 416, rear clutch control valve 280 and oil pass 417 to cause the rear clutch 12 to be engaged. In the course of this shifting operation, the oil pressure control valve 250 of the oil pressure control device 340 for controlling the low reverse brake acts to adjust the oil pressure to be supplied to the rear clutch 12 and prevent the shock. In other words, as the detecting means contained in the electronic control device 290 such as a computer detects the start of a shifting, the duty control of the solenoid valve 325 controlled by the electronic control device 290 acts to adjust the oil pressure Ps at the downstream of the orifice 426 in the oil pass 408. It also changes the output oil pressure Pa supplied to the oil pass 422 from the oil pass 414 to thereby prevent an abrupt rise in the oil pressure in the oil pressure chamber of the rear clutch 12 and prevent the shock at the time of shifting. As the spool 274 of the N-R control valve 270 which connects with the oil pass 408 in the downstream of the orifice 426 functions as an accumulator to absorb the pulse of the control oil pressure Ps by the action of the oil pressure receiving surface 271 and the spring 275. When the oil pressure from the oil pass 422 is introduced between the lands 216 and 217 of the N-D control valve 210, the spool 211 is pressed to the right in FIG. 3 overcoming the energizing force of the spring 212 by the difference in area of the surfaces 214 and 215 to intercept the connection between the oil passes 422 and 416. On the other hand, the oil pass 414 is connected with the oil pass 416 via the oil pass 415 which is interposed with the orifice 473. The oil pass 414 also connects with the oil pass 474. As a result, so long as the manual valve 150 is retained at the D position, the oil pass 414 is connected to the oil pass 416 while by-passing the oil pressure control valve 250. This in turn prevents the oil pressure chamber of the rear clutch 12 from being influenced by reduction in the oil pressure during shifting caused by the oil pressure control valve 250 and the solenoid valve 325 and prevents shock in shifting due to slip of the rear clutch 12 and other disadvantages such as idling of the engine.

The oil pressure controlled by the oil pressure control valve 250 is supplied from the oil pass 422 to the 1st-2nd speed shift valve 170 and further introduced to the oil pressure chamber of the low reverse brake 15. When the manual valve 150 is at the D position and the auxiliary switch comprising an inhibitor switch and an ON-OFF switch is positioned at 2, D₃ or D₄ position, the electronic control device 290 supplied with detected signals from the position detecting means 341 and 342 acts as a duty control of the solenoid valve 325 to supply the oil pressure in the oil pass 422 to the low reverse brake 15 as a low pressure oil. And by transmitting the driving force of the engine by means of the oneway clutch 16, the gear is put in the first speed and the low reverse brake is engaged to such an extent as to cause slip. There is no problem in this since the rear clutch 12 is supplied with the line pressure as described above. On the other hand, when the auxiliary switch is positioned at L, it is necessary to employ the 1st-speed engine brake and therefore it is necessary to supply the low reverse brake 15 with a high pressure oil, i.e. the line pressure. Duty control of the solenoid valve 325 is suspended by the electronic control device 290 and the oil pressure of the oil pass 414 is supplied to the oil pass 422 as it is to completely engage the low reverse brake 15.

In this case, i.e. when the gear is put in the 1st-speed with the L-position, the engine brake at the first speed can be effected by the rear clutch 12 and the low reverse brake 15.

Thus, since the low reverse brake 15, provided in parallel with the oneway clutch 16, is supplied with the high pressure oil only when the engine brake at the first speed is necessary, the force required to activate the oil pump 26 can be reduced.

When the speed ratio is set at the low speed ratio in the D range, no hydraulic oil is supplied to the low and reverse brake 15, and the torque reaction is borne by the one-way clutch 16. Therefore, during an upshift from the low speed ratio to the second speed ratio in the D range, the ratio change is achieved by merely newly supplying hydraulic oil to the kick-down brake 14. Also, during a downshift from the second speed ratio to the low speed ratio in the D range, the ratio change is achieved by merely taking off the kick-down brake 14. Consequently, shock during the shift can be reduced.

When the manual valve 150 is switched from N to D, the shift control valve 130 is also supplied with the oil pressure from the oil pass 414. However, when the gear is put in the first speed with the orifices 311 and 321 being open as the solenoid valves 310 and 320 are made electrically alive, the oil pressure in the downstream of orifices 471 and 472 becomes substantially 0 kg/cm$^2$ because of said orifices 471 and 472. And, the high pressure produced between the lands 140 and 141 of the spool 132 causes the spool 132 to move to and stop at the leftmost end as in FIG. 3 by the force pressing to the left due to the difference in area of the lands 140 and 141.

Procedure for upward shifting is now explained. As the vehicle in the 1st-speed gear gathers speed with the acceletator pedal being stepped on, the electronic control device 290 transmits a command signal to the solenoid valves 310 and 320 to achieve the second speed, when the solenoid valve 310 becomes electrically dead while the solenoid valve 320 is kept electrically alive.

By this switching, the high pressure oil in the oil pass 470 is introduced between the lands 136 and 137 of the spool 131, the oil hole 139, the oil pressure chambers 138 and 144, between the lands 142 and 143 of the spool 133 via the orifice 471. The spool 131 moves toward the right integrally with the spool 132 and stops in abutment with the spool 134. As a consequence, the line pressure in the oil pass 414 passes through the lands 140 and 141 of the spool 132 to be led to the oil pass 412 and acts on the oil pressure chamber 173 of the 1st-2nd speed shift valve 170 to cause the spool 171 to move toward the right end as in FIG. 3. The line pressure also acts on the oil pressure chamber 233 of the 4th-speed clutch control valve 230 to move the spool 231 to the right end as in FIG. 3. The line pressure which is introduced to the oil pass 422 at the 1st-2nd speed shift valve 170 is supplied to the oil pressure chamber 423 at the coupling side of the kick-down brake 14 via the oil pass 428, whereby the rod 424 moves to the left in resistance to the spring 425 to engage the brake band (not shown) with the kick-down drum 25. On the other hand, the oil pressure in the oil pass 453 is discharged via the oil pass 409 connecting with the N-R control valve 270 to release the engagement of the low reverse brake 15 and to shift to the second speed.

During this shifting to the second speed, the oil pressure control valve 250 is controlled by the oil pressure of the solenoid valve 325 to reduce the oil pressure of the oil pass 422 and prevent the shock at the time of shifting.

When the electricity supply to the solenoid valves 310 and 320 is cut off in order to shift to the third speed by the command from the electronic control device 290, the line pressure is supplied to an intermediate position between the outside of the land 137 of the spool 131 in the shift control valve 130 and the stopper 134. The spool 132 moves toward the right as in FIG. 3 by the line pressure acting on the pressure receiving surface of the land 140 and stops with the pressurizing portion abutting against the spool 133. The oil pass 414 becomes connected with the oil pass 430 so that the line pressure is transmitted to the oil pressure chamber 193 of the 2nd-3rd and 4th-3rd speed shift valve 190 to thereby switch the position of the spool 191 of the 2nd-3rd and 4th-3rd speed shift valve 190 to the right. At this time, the oil pass 428 connecting with said shift valve 190 is connected to the oil pass 432 via the orifice 429. The oil pass 423 reaches the oil pressure chamber 234 at the right end of the 4-speed clutch control valve 230 via the switch valve 452 and at the same time connects with the oil pressure chamber of the front clutch 11 via the oil pressure chamber 433 at the releasing side of the kick-down brake 14 and the switch valve 434. This structure of the oil pass 432 connecting with the oil pressure chamber 433 at the releasing side of the kick-down brake 14 and the oil pressure chamber of the front clutch 11 enables coupling and releasing of the two in an overlapping manner in time-wise.

Even in the course of shifting from the second to the third speed, the oil pressure control valve 250 acts exactly in the same manner as in shifting from the first to the second speed as described above to briefly maintain the oil pressure supplied to the oil pass 422 at a lower value. The orifice 429 is interposed in the oil pass 428, and when said oil pressure control valve 250 is in operation by the action of the orifice 429, the oil pressure both in the oil pressure chamber 433 and the oil pressure chamber of the front clutch 11 is maintained at the same low pressure to cause the front clutch 11 to be engaged simultaneously with the release of the kick-down brake 14. Subsequently as the oil pressure control valve 250 is suspended to cause the oil pressure to increase up to 6 kg/cm$^2$, the front clutch 11 is completely engaged and the third speed is obtained. When the third speed is obtained, the rotational speed of the input shaft 10 and the kick-down drum 25 approaches the rotational speed of the output shaft 24 to synchronize with the same. The rotational speed at which the shaft and the drum synchronize or the same just before synchronization is set as the time of completion of shifting and this is detected by the number of rotation detectors 332 and 333 to suspend the operation of the oil pressure control valve 250 to thereby increase the oil pressure supplied to the front clutch 11 to 6 kg/cm$^2$. The increase in the oil pressure also causes increase in the oil pressure of the oil pressure chamber 234 at the right end of the 4-speed clutch control valve 230 so that the spool 231 is switched to the left end as shown in FIG. 3. The line pressure of the oil pass 430 is supplied to the 4-speed clutch 13 via the oil pass 445 and the 4-speed clutch is retained engaged. The oil pass 445 connects with the oil chamber 234 via the switch valve 452 and the oil pass 451. Once the oil pressure is supplied to the oil pass 445, the spool 231 of the 4-speed clutch control valve 230 is retained at the left end as in FIG. 3 and the oil pressure in the oil pass 445 is released, thereby preventing such disadvantages as caused by release or slip of the 4-speed clutch 13 to hinder shifting or cause neutral gear during shifting from third to the fourth speed.

When the solenoid valve 310 which achieves the fourth speed by the command from the electronic control device 290 is held electrically alive while maintaining the solenoid valve 320 is made electrically dead with the auxiliary switch positioned at D$_4$, the oil pressure in the oil pressure chamber 144 of the shift control valve 130 is reduced to cause the spool 133 to move toward the rightmost end as in FIG. 3 together with the spool 132. As a result, the line pressure in the oil pass 414 is transmitted to the oil pressure chamber 293 of the rear clutch control valve 280 via the oil pass 436 and to the oil pass 445 via the check valve 235.

The line pressure introduced in the oil pressure chamber 293 causes the spool 291 of the rear clutch control valve 280 to move toward the rightmost end as in FIG. 3, connecting the oil pass 436 with the oil pass 456 to supply the line pressure to the oil pressure chamber 194 of the shift valve 190 for 2nd-3rd and 4th-3rd speed. The spool 191 of said valve 190 is switched to the leftmost end as in FIG. 3. At this moment, the oil in the oil pressure chamber of the rear clutch 12 is discharged from the oil outlet port 295 of the rear clutch control valve 280 to instantly release the rear clutch 12. At the same time, the oil in the oil pressure chamber of the front clutch 11 and the oil pressure chamber 433 of the kick-down brake 14 is respectively discharged from the oil outlet port 195 in the shift valve 190 for 2nd-3rd and 4th-3rd speed via the orifice 196 to release the front clutch 11, whereby the kick-down brake 14 is engaged. As in the case of shifting from 1st-2nd or 2nd to 3rd speed mentioned above, the oil pressure control valve 250 acts to briefly reduce the oil pressure in the oil pass 422 during gear shifting. This reduces the oil pressure acting on the oil pressure chamber 423 of the kick-down brake 14 for its engagement so that said engagement is made smoothly. When the oil pressure rises to 6 kg/cm$^2$ to complete the engagement, the fourth speed is obtained.

Contrary to the up-shift procedure mentioned above, the down-shift is achieved in accordance with the ON-OFF of the solenoids 310 and 320 operated by the command from the electronic control device 290. To illustrate the downshift procedure, the shifting from 2nd to 1st speed is explained.

When the gear is shifted from 2nd to 1st speed, the solenoid valves 310 and 320 are both made electrically alive and the spools 131 and 132 move to the leftmost end in the shift control valve 130 to release the oil pressure in the oil pass 412. The spool 171 of the shift valve 170 for the 1st-2nd speed and the spool 231 of the 4th speed clutch control valve 230 are thereby shifted to the left to discharge the oil in the oil pressure chamber of the kick-down brake 14 and release the same. At the same time, the low reverse brake 15 is engaged to shift down to the first speed. When the select lever and the auxiliary switch are manipulated to position at $D_3$ or 2, the low reverse brake 15 will be engaged under lower oil pressure by means of the oil pressure control device 340 for the low reverse brake, as in the case of up-shift operation. Also with the position $D_3$ or $D_2$, switching of the oil passes by means of the manual valve 150 is not done. The position detectors 341 and 342 for the select lever and the auxiliary switch respectively detect the position and transmit signals to the electronic control device 290 to control the solenoid valves 310 and 320 to prevent shifting the gear to 4th or 3rd speed.

When the manual valve 150 is positioned at L, the position detector 341 for the select lever detects the position and the 2nd speed gear is maintained if the driving speed of the vehicle at the initial stage of said selection is greater than the predetermined value, e.g. 50 km/h. As the vehicle slows down thereafter, the solenoid valves 310 and 320 function to control the transmission gear at the 1st speed. During shifting, however, the oil pressure control valve 250 maintains the oil pressure at a lower value to prevent shifting shocks. Once shifting is completed, on the other hand, a high pressure oil, or the line pressure, is supplied to the low reverse brake 15 to completely engage the same.

The mechanism for putting the gear in reverse is now described.

As the manual valve 150 is positioned at R, the oil pass 401 is connected to the oil pass 421, which in turn connects with the low reverse brake 15 via the N-R control valve 270, the oil pass 409, the shift valve 170 for 1st-2nd speed, and the oil pass 453. On the other hand, the oil pass 401 is connected to the switch valve 434 via the oil pass 405 to supply the oil pressure chamber of the front clutch 11 with oil for engaging the clutch 11 and the brake 15 to obtain the reverse gear.

During this shifting to the reverse, the N-R control valve 270 functions as an oil pressure adjusting valve and the spool 254 and the spring 255 of the oil pressure valve 250 act as an accumulator for alleviating the pulsation. This way, the output pressure from the oil pass 409 is reduced to prevent shifting shocks.

In the foregoing, an instance where the auxiliary switch is positioned at L is described as an example where the engine brake at the 1st speed is required. However, it is also possible to supply the low reverse brake with high pressure oil at such cases as: (1) when the brake pedal is harshly stepped on; (2) when the brake pedal is stepped on for a given period of time; (3) when the accelerator pedal is released for a given period of time and the downslope gradient of the road is great; and (4) when the vehicle collects speed at a rate greater than a given value despite the accelerator pedal is released. In this case, a potentiometer which detects the degree of accelerator pedal or brake pedal stepping and other detecting means of pendulum type such as detector for the gradient of the road, etc. can be additionally provided to produce signals which can be transmitted to the electronic control device to determine whether the engine brake is necessary or not.

Although in the embodiment mentioned above the engine brake employed during the first gear driving is explained, it is applicable to any of the gears in the lower speed range except for the highest speed.

As has been described by way of an embodiment, the transmission gear system according to the present invention is provided with friction engagement devices in parallel with the oneway clutch for cancelling the engine brake. These friction engagement devices are normally supplied with a low pressure oil but when the engine brake is necessary a high pressure oil is supplied. This enables easy timing of release or engagement of the friction engagement devices during the upward or downward shifting operation and prevents shocks due to shifting. It also reduces the driving force necessary for driving the oil pump which outputs the oil, whereby the oil pressure circuit can be made simple and the efficiency of the system as a whole can be improved.

What is claimed is:

1. An automatic transmission gear system for vehicles comprising a plurality of advance gears, a oneway clutch for achieving a gear shift at a lower speed and a friction engagement device provided in parallel with said oneway clutch and operated by oil pressure, a manual valve connected to a source of oil pressure, which is a characterized in that it is provided with detecting means which detect at least one parameter indicating the operating or driving conditions of the vehicle, and an oil pressure control device which is fluidly interposed between the manual valve and the friction engagement device and which supplies said friction engagement device with a high pressure oil when the engine brake is necessary at said gear shift at the lower speed and with a low pressure oil at which said friction engagement device is substantially released when the engine brake is not necessary in correspondence with the signals transmitted from said detecting means, said oil pressure control device including first and second valve means fluidly coupled together and to the manual valve, said first and second valve means cooperating so that when one valve means is controlling oil pressure, the other valve means is inoperative, each valve means also being an oil pressure pulse accumulator when it is not controlling oil pressure, and a solenoid valve means connected to said detecting means and to said first and second valve means for detecting different driving conditions to control operation of said first and second valve means, and a speed shifting valve connected to said first and second valve means and to said friction engagement device to supply oil to that friction engagement device from said first and second valve means.

2. The automatic transmission system for vehicles as claimed in claim 1 which is characterized in that said oil pressure control device comprises: an oil pressure electronically controlling valve which is located at an intermediate position between an oil pass connecting an oil source with said friction engagement device and is constructed to vary the oil pressure to be supplied to said friction engagement devices in correspondence with the controlling oil pressure; an electromagnetic valve which is capable of varying said controlling oil pressure by opening/closing an oil outlet port located between an orifice in the oil pass connecting the oil source and said oil control valve; and an electronic control device which is capable of varying the proportional length of time for opening and closing said electromagnetic valve in accordance with the signal from said detecting means as well as of opening/closing said valve periodically.

3. The automatic transmission gear system as claimed in claim 2 wherein said detecting means is so constructed as to electrically detect the position of a means for selecting the gear shift or the pattern of the shift.

* * * * *